March 9, 1954

H. J. SWAYNE 2,671,848

COMBINED BACKING-UP AND TROUBLE LAMP
ASSEMBLY FOR MOTOR VEHICLES
Filed Jan. 31, 1952

Inventor
H. J. Swayne
By Featherstonhaugh & Co.
Attorneys

Patented Mar. 9, 1954

2,671,848

UNITED STATES PATENT OFFICE 2,671,848

COMBINED BACKING-UP AND TROUBLE
LAMP ASSEMBLY FOR MOTOR VEHICLES

Hugh J. Swayne, Montreal, Quebec, Canada

Application January 31, 1952, Serial No. 269,136

7 Claims. (Cl. 240—8.18)

1

This invention relates to a combined backing-up and trouble lamp assembly for motor vehicles.

One object of the invention is to provide a lamp assembly of attractive appearance which is inexpensive to manufacture and install.

Another object is to provide a lamp assembly of the character described in which the component parts are designed so that said assembly may be mounted in a theft-proof manner on a motor vehicle panel forming an outside wall of an enclosed space to which access is preventable, said assembly being mounted on said panel so as to be detachable therefrom only on removal of an anchoring element housed within said space.

A further object is to provide a backing-up lamp assembly including circuit controlling means whereby the backing-up lamp is automatically energised in response to shifting of the gear lever of the motor vehicle to its reversing or backing-up position.

A further object is to provide manually operable lamp circuit controlling means whereby the backing-up lamp may be energised independently of closure of the ignition switch or operation of the gear lever of the motor vehicle.

A further object is to provide a combined backing-up and trouble lamp assembly in which the lamp is detachably mounted on a rear portion of the vehicle and is permanently connected to the battery or other vehicle-carried source of energy by conductors of sufficient length to permit the lamp to be used as a portable trouble lamp when detached from the motor vehicle.

Other objects, advantages and characteristic features of the invention will appear from the following detailed description of the accompanying drawings.

Figure 3:
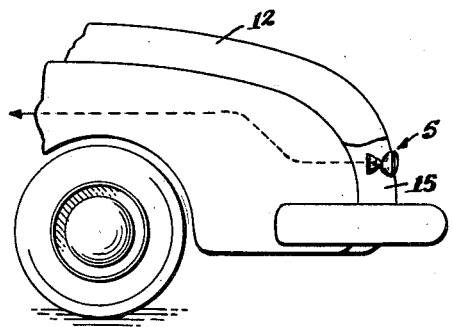
Fig. 3 is a fragmentary elevational view of the rear of an automobile equipped with my invention.

2 removed from reverse gear position, thus opening the back-up light circuit, but showing a bypass switching arrangement used to complete the trouble lamp circuit.

In these drawings my improved lamp assembly is generally indicated at 5. It includes a tubular housing 6 having one end completely open as indicated at 7 and having the other end partially closed by an end wall 8 provided with a central opening 9. A considerable portion of the length of housing 6, adjoining the open end 7, is externally screw-threaded as indicated at 10.

In the present instance the housing 6 is shown arranged within an enclosed space 11 constituting the rear trunk compartment of an automobile 12. Housing 6 is arranged in this space with its open end 7 projecting outwardly through an opening 14 formed in a panel 15, constituting the rear outside wall of said space or trunk compartment 11. The housing 6 is clamped to and supported on panel 15 by inside and outside clamping nuts 16 and 17 screwed onto the threaded portion 10 of the housing. The inside nut 16 is screwed tightly against a sealing gasket 18 bearing against the inner side of panel 15 and the outside nut 17 is similarly screwed against a sealing gasket 19 bearing against the outer side of said panel.

A lamp carrying tube 20 is arranged to extend through housing 6 with the outer end of the tube projecting a substantial distance beyond the open front end of the housing and the rear end of the tube protruding through the opening 9 at the inner end of the housing. The front end of tube 20 carries a lamp unit 22 which is preferably of the sealed-beam type. The reflector casing 23 of lamp unit 22 is butted against a housing closure and coupling member 24 fitted on the adjacent portion of tube 20. In the present instance tube 20, reflector casing 23 and housing closure member 24 are shown secured against relative rotation by means of a clamping nut 25 threaded on the extreme outer end of tube 20 and screwed tightly against the inner surface of reflector casing 23 and a second clamping nut 26 threaded on tube 20 and screwed tightly against the inner surface of the central portion of member 24. Instead of using nut 25 for securing reflector casing 23 on tube 20 in abutting engagement with member 24 the same result may be accomplished by merely flanging the outer end of tube 20 over the inner surfaces of said reflector casing.

Figure 1:
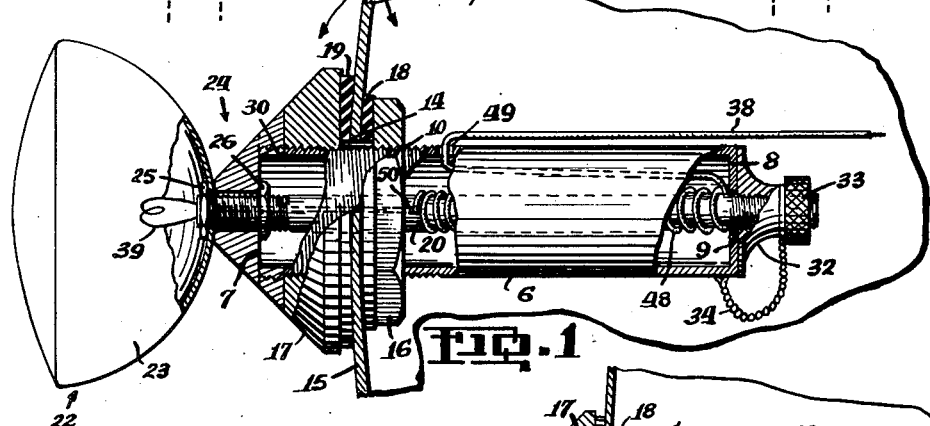
Fig. 1 is a partially elevational and partially cross-sectional view of my lamp fitted to an automobile panel.

In the assembled relation shown in Fig. 1 the member 24 is fitted over the open outer end of housing 6 in abutting engagement with clamping nut 17 and is provided with projections 28 fitted in recesses 29 in clamping nut 17. The projections 28 also extend into slots 30 provided in the outer end of housing 6. It will thus be seen that projections 28 provide interfitting connection between housing closure member 24, housing 6 and the clamping nut 17 which couples these parts together and holds them against relative rotation. This is an important feature of the invention which, in the locked condition of the trunk compartment 11, prevents unauthorized removal of the lamp by turning movement of the exposed parts.

The housing closure and coupling member 24 is retained in interlocked assembly with housing 6 and clamping nut 17 by means of an anchoring nut 32 screwed onto the rear end of lamp carrying tube 20 in clamping engagement with end wall 8 of housing 6. This anchoring nut 32 is provided with a knurled head 33 for convenient turning and is preferably secured against loss by a fastening chain 34 attached to housing 6.

Corresponding ends of suitable electrical conductors 36 and 37, enclosed in a suitable sheath 38, are connected to the terminals of light source 39 of lamp unit 22. The other end of conductor 36 is directly connected to terminal 41 of the vehicle carried battery 43 and the other end of conductor 37 is connected to battery terminal 42 through the ignition switch 44 and a reverse-lever actuated switch 45. A by-pass switch 46 is connected across the lamp circuit as shown so that light source 39 of lamp unit 22 may be energized by closure of this switch when the ignition switch 44 and the lever actuated switch 45 are in open-circuit position.

During use of the lamp assembly as a backing-up light the component parts are secured in assembled relation with each other and with supporting panel 15 as shown in Fig. 1. The lever actuated switch 45 may be of any suitable type which is closed only by the reverse lever 47 when the latter is shifted to reversing position. It will thus be seen that, in the closed position of ignition switch 44, the energizing circuit of the lamp unit is automatically energized by closure of switch 45 in response to shifting of lever 47 to its reverse position.

Figure 4:
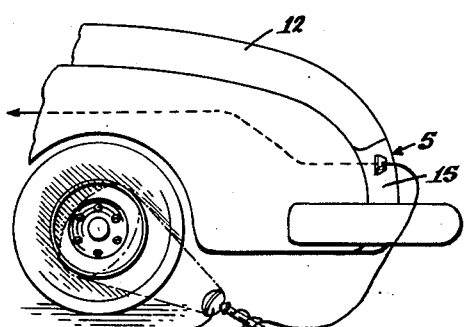
Fig. 4 is a view similar to Fig. 3 except that the lamp unit is shown removed for use as a portable trouble light.
Figure 5:
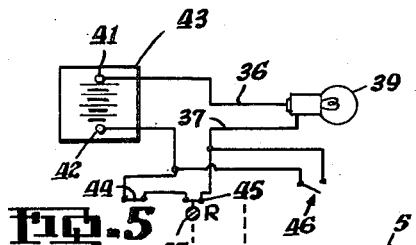
Fig. 5 is a diagrammatic view showing how the back-up light wiring circuit is completed when the gear-selector lever is placed in its reverse gear position.
Figure 6:
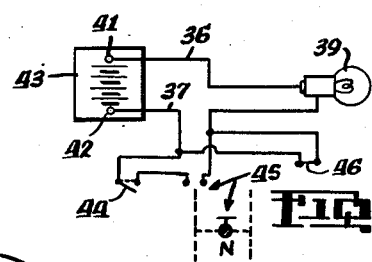
Fig. 6 is also a diagrammatic view similar to Fig. 5; however, the gear-selector lever is shown
Figure 2:
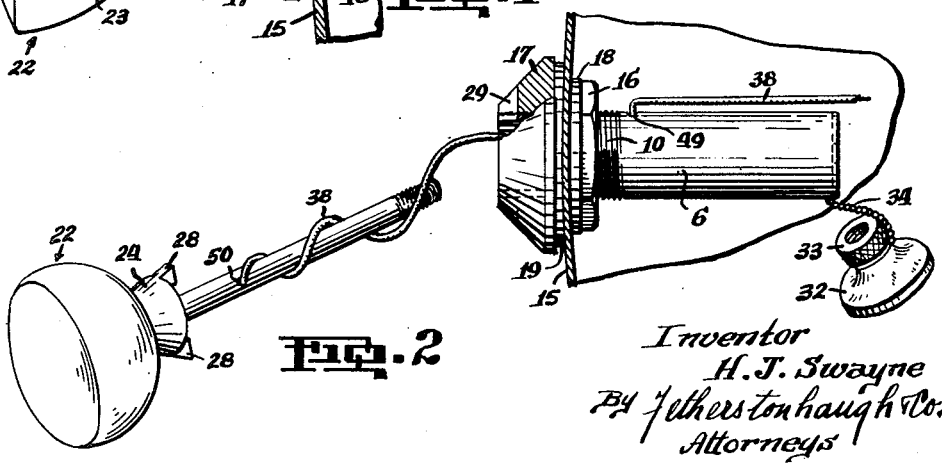
Fig. 2 is an elevational view similar to Fig. 1 with the lamp retaining nut removed and the trouble light in an operative position.

When it is desired to use lamp unit 22 as a portable trouble lamp 6 this is accomplished by gaining access to the enclosed space 11 and removing anchoring nut 32 so that the parts of the assembly comprising lamp unit 22, housing closure member 24 and lamp carrying tube 20 may be separated from housing 6 and moved to any desired position as indicated in Figs. 2 and 4. In order to provide for this, the conductors 36 and 37 are made sufficiently long with a slack portion thereof normally coiled about a portion of the tube 20 as indicated at 48. In this connection it will be noted that the conductors 36 and 37 are passed into housing 6 through a suitable opening 49 and that the portions of the conductors leading from the coiled portion 48 to the terminals of light source 39 are passed into tube 20 through a side opening 50.

When lamp unit 22 is no longer required as a trouble lamp the conductors 36 and 37 are recoiled about tube 20 and the tube carried parts of the lamp assembly are then reassembled with the housing 6, outer clamping nut 17 and anchoring nut 32 in the manner shown in Fig. 1.

During use of lamp unit 22 as a portable trouble lamp the energizing circuit of light source 39 is closed by manual closure of switch 46 which is normally in open-circuit condition. This provides for use of the unit 22 as a portable trouble lamp when the motor vehicle is stationary with the switches 44 and 45 in open-circuit position.

Having thus described the nature of my invention and a preferred embodiment thereof it will be understood that various modifications may be resorted to within the scope and spirit of the invention as defined by the appended claims.

I claim:

1. The combination with a motor vehicle panel forming an outside wall of an enclosed space to which access is preventable, of a backing-up and trouble light assembly secured to said panel so as to be detachable therefrom only on release of an anchoring element positioned in said space, said assembly comprising a hollow tubular housing open at one end and provided at the opposite end with an end wall having an opening therethrough, said housing being arranged at the inner side of said panel with its open end protruding outwardly through an opening in the panel, means for clamping said housing to said panel comprising clamping nuts threaded on said tubular member and located respectively at the inner and outer sides of said panel, a lamp-carrying tube extending through said housing with the outer end of the tube projecting beyond the open outer end of the housing and the inner end of the tube protruding through the opening of the inner end wall of the housing, a lamp unit including a lamp casing secured to the outer end of said tube, a housing closure member arranged on the outer portion of said tube and closing the outer end of the housing, said housing closure member being butted against the casing of the lamp unit and against the outer of said clamping nuts, said housing closure member being permanently secured against rotation relative to said tube and said lamp casing, and means for preventing rotation of the housing closure member and the said outer clamping nut relative to said housing when said closure member is in its housing closing position butted against said outer clamping unit and means for anchoring said tube, lamp unit and housing closure member in assembled relation with said housing, said last mentioned means comprising a clamping nut threaded on the inner end of said tube in clamping arrangement with the inner end wall of said housing.

2. The combination claimed in claim 1, in which the housing closure member is clamped against the lamp casing and held against rotation relative to said casing and said tube by means of a clamping nut threaded on the tube and bearing against the inner side of said closure member.

3. The combination claimed in claim 1, in which the housing closure member and the outer clamping nut of the housing are held against rotation relative to the housing by means of projections on the housing closure member disposed in interfitting engagement with portions of said clamping nut and extending into slots provided in the outer end of said housing.

4. The combination claimed in claim 1, including conductors connected at one end to a source of electrical energy mounted on the motor vehicle and at the other end to the terminals of said lamp unit, said conductors passing into said lamp housing through an opening in the wall of said housing and having a substantial portion of the length thereof coiled around said tube and another portion thereof, lying between the lamp unit and the coiled portion, housed within said tube, the latter being provided with an opening in its wall for the passage of the conductors therethrough.

5. A lamp assembly of the character described comprising a hollow tubular housing having an open end adapted to be passed through an opening in a supporting panel and having the opposite end partially closed by an end wall having a tube-receiving opening extending therethrough, means for clamping said housing to said panel comprising clamping nuts threaded on said housing, a lamp-carrying tube extending through said housing with one end of the tube projecting beyond the open end of the housing and the other end of the tube protruding through the tube-receiving opening of the end wall at the opposite end of the housing, a lamp unit secured to the end of the tube projecting beyond the open end of the housing, a member arranged on the outer portion of said tube adjacent said clamp casing and closing the outer end of the housing and an anchoring nut threaded on the opposite end of the tube in clamping engagement with the said end wall of the housing.

6. A lamp assembly as set forth in claim 5, in which the member closing the outer end of the housing is provided with projections adapted to be received in recesses provided in one of said clamping nuts, said projections being also fitted in slots provided in the open end of the housing.

7. A lamp assembly as set forth in claim 5, including conductors having end portions thereof housed within an end portion of said tube and connected to the terminals of a light source contained within the casing of the lamp unit, intermediate portions of said conductors being coiled around the remaining portion of said tube and other portions of the conductors forming continuations of the coiled portions being extended outwardly through an opening in the side wall of the tubular housing for connection to a source of electrical energy.

HUGH J. SWAYNE.

References Cited in the file of this patent

UNITED STATES PATENTS

| Number | Name | Date |
|---|---|---|
| 1,392,441 | Nikonow | Oct. 4, 1921 |
| 2,009,682 | Stofer | July 30, 1935 |
| 2,046,976 | Sorensen | July 7, 1936 |
| 2,598,657 | Hollins | May 27, 1952 |